July 27, 1965   L. HYLWA   3,197,606
FLUID DISPENSER FOR WELDING MACHINES
Filed March 19, 1962

INVENTOR
Louis Hylwa
BY
Robert C. Strausser
ATTORNEY

United States Patent Office 3,197,606
Patented July 27, 1965

3,197,606
FLUID DISPENSER FOR WELDING MACHINES
Louis Hylwa, Seneca Falls, N.Y., assignor to Sylvania Electric Products Inc., a corporation of Delaware
Filed Mar. 19, 1962, Ser. No. 180,693
5 Claims. (Cl. 219—78)

This invention relates generally to a fluid dispenser and more particularly to an improved means for dispensing volatile fluids to achieve a controlled localized atmosphere during resistance welding operations.

In certain types of resistance welding, especially in spot welding applications, it has been found advantageous to utilize predetermined atmospheres to achieve optimum welding conditions. Oxides and related types of contamination on the surfaces of the metals being so joined are detrimental to the achievement of a satisfactory jointure. To combat surface oxidation during the welding process, it has been common in the art to surround the immediate weld area with a nonoxidizing atmosphere. In addition, it has been found desirable to employ a reducing atmosphere to control the gases released from the metals during the welding process and further prevent the formation of unwanted oxidation at the jointure area.

A convenient and desirable welding atmosphere has been provided by the vaporization of an alcohol at the welding area. The fluid alcohol, which may be contained in a reservoir convenient to the welding machine, has usually been gravity fed through an adjustable flow-controlling means and associated tubing to a dispensing orifice located in the proximity of the weld area. The rate of fluid flow has normally been adjusted by the flow-control means to result in the delivery of a quantity of volatile fluid in the form of a regulated drip. The constancy of fluid delivery, being independent of the welding cycle, usually provided an excessive amount of alcohol to the weld area, thereby creating a hazardous condition since vaporization of the excess alcohol produced undesirable quantities of combustible and noxious vapors.

Accordingly, it is an object of the invention to reduce the aforementioned disadvantages by accurately and controllably dispensing the volatile fluid to the weld area in order to provide a localized vaporous atmosphere appropriate for welding.

Another object is to repetitively dispense a controlled amount of volatile liquid in accordance with the requirements of the welding operation.

An additional object is to provide a volatile fluid supply which is subjected to minimum cavitation to insure the uniform delivery of the desired amount of volatile fluid to the weld area.

The foregoing objects, as well as other objects which will become apparent after reading the following descriptions, are achieved in one aspect of the invention by providing a variable pressure fluid source which is connected, through timer-actuated valving means, with a nozzle having an orifice located adjacent the welding area. The nozzle is formed to provide a limited fluid passageway having a given resistance to fluid flow, and the tube connecting the valving means with the nozzle is formed to maintain a continuous fluid column from the valving means to the nozzle orifice when the valving means is closed and the nozzle orifice is at atmospheric pressure. During the welding operation the timer actuates the valving means and allows a specified amount of fluid to move therethrough for application to the fluid column, which is moved by the applied pressure from the fluid source to cause the ejection of a specified amount of fluid from the nozzle orifice. The amount of ejected fluid is sufficient, upon vaporization by the inherent welding heat, to form the volume of localized atmosphere desired to enhance the welding procedure.

For a better understanding of the present invention, together with other and further objects, advantages, and capabilities thereof, reference is made to the following disclosure and appended claims in connection with the accompanying drawings in which:

Figure 1:
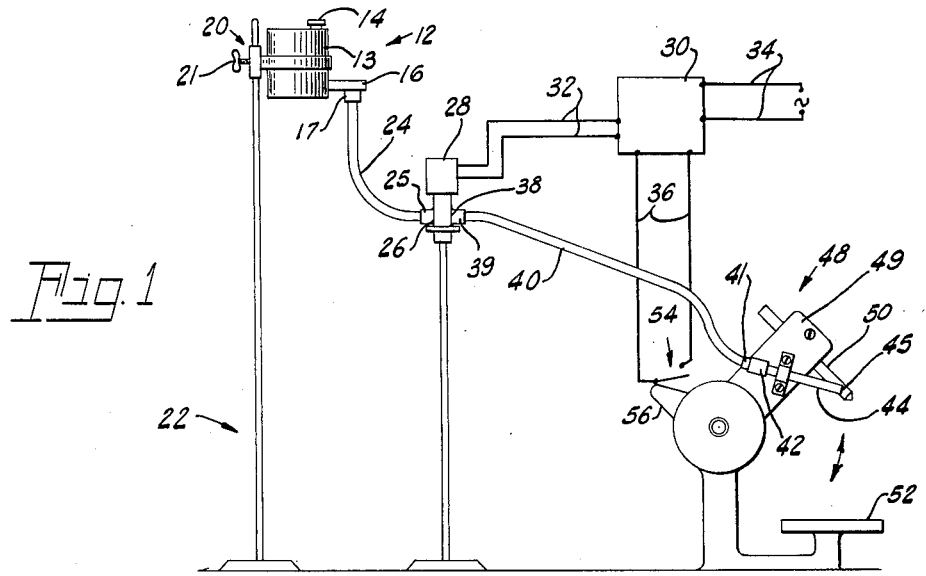
FIG. 1 is a perspective view of a dispensing device and welder.

FIG. 1 shows a resistance welding machine 48, which in a conventional manner, utilizes two electrodes to make jointures of the spot weld variety. Top electrode 50 is arcuately movable to make welding contact as desired with fixed bottom electrode 52. Electric power for the welding operation may be supplied from a conventional source, not shown.

As mentioned above, there are welding situations wherein it has been found advantageous to utilize predetermined and localized atmospheres to achieve optimum welding conditions. FIG. 1 portrays a welding setup of this nature whereby a volatile fluid is dispensed from the orifice of a nozzle 44 to the top electrode 50 at a point adjacent the weld area. The fluid thereby dispensed is vaporized by the welding heat to form a localized atmosphere immediately surrounding the weld area. The dispensing nozzle 44 is connected to a fluid supply source 12 in a manner to provide fluid flow therefrom through a timer controlled valving means 28. The operation of the timer 30 is actuated by a switching means 54 which is cyclically integrated within the welding operation.

Referring in detail to FIG. 1, the fluid supply source 12 is shown as a container 13 made of glass or a suitable plastic such as polyethylene having a top refill aperture capped by a vented closure 14. A second opening 16 in the reservoir, at substantially the bottom thereof, enables the fluid to flow therefrom as desired. In this instance, the fluid is of a volatile nature, for example, an alcohol such as methanol, which is capable of vaporization at temperatures inherent in the welding operation to produce a reducing atmosphere as the desired end product. The reservoir container 13 is affixed by compression clamping to a height adjustment means 20 such as screw clamp 21 on vertical stand 22.

A flexible fluid-supply tube 24 of suitable material is joined at one end to the reservoir opening 16 by non-corrosive liquid-tight fittings 17. The opposite end of fluid-supply tube 24 is joined in like manner by non-corrosive liquid-tight fittings 25 to the intake 26 of valving means 28 which is, in this instance, a solenoid valve. The valve is shown as mounted at a level lower than reservoir container 13 so that hydraulic pressure will be gravity-exerted at the intake 26 of valving means 28 by the fluid in reservoir container 13 and fluid-supply tube 24 in order to provide a pressurized fluid supply source.

If desired, a fluid containing reservoir, pressurized by a suitable pump or piston, may be positioned at a different level and remotely located from valving means 28 in order to provide a pressurized fluid supply source applicable to the specific requirement.

The opening and closing of solenoid valve 28 is electrically controlled by an electric timer 30 having an output pulse of adjustable time duration which is electrically connected to valve 28 by conductive means or leads 32. Electrical power for timer 30 is supplied from an external source, not shown, by wires or conductive means 34. The electric actuating signal for the timer 30 is supplied through conductor 36 from switching means 54 located on resistance spot-welding machine 48. The switching means 54 may be mechanically actuated at a predetermined sequence in the welding cycle. For example, switching means 54 may be actuated by a lever 56 or similar device operable in accordance with the movement of a certain part of the welding machine 48 when the arcuately moving top electrode 50 reaches a predetermined spaced position from the bottom welding electrode 52, e.g., .250 inch.

The timer 30, when energized by the pulse from the switching means 54, opens valve 28 for a predetermined interval to permit the passage therethrough of a specific quantity of pressurized fluid as heretofore mentioned.

A suitable fluid storage tube 40 is preferably made from flexible material such as tetrafluoroethylene tubing commercially available under the trade name "Teflon" from E. I. du Pont de Nemours & Co. (Inc.), Wilmington, Delaware. This tubing is joined at one end to the outlet 38 of valve 28 by noncorrosive liquid-tight fittings 39, and in similar manner the opposite end of the fluid storage tube 40 is joined by a noncorrosive liquid-tight fitting 41 to the inlet connection 42 of the hollow dispensing nozzle 44. The dispensing nozzle 44, which is preferably of a metal such as stainless steel, is positioned on welding arm 49 so that the nozzle orifice 45 is closely adjacent top welding electrode 50 at a point near the welding end thereof as, for example, .125 inch. This permits placement of the volatile fluid near the welding end of the top electrode 50 in the proximity of the weld area.

The internal dimensions of the hollow dispensing nozzle 44 provide a limited fluid passageway having a given resistance to fluid flow which, in conjunction with the internal diameter of the fluid storage tube 40, is capable of supporting a continuous fluid column from valve 28 to the nozzle orifice 45. In order to maintain a continuous fluid column, the internal dimensions of the dispensing nozzle 44 and the fluid storage tube 40 are dependent to some extent upon the nature of the fluid to be contained therein. The molecular cohesion between the fluid molecules must be related to the molecular adhesion exhibited by the fluid molecules with the surface molecules on the internal area of the dispensing nozzle and fluid-storage tube 40 so as to provide a static fluid condition when valve 28 is closed and the area of exposed liquid at the nozzle orifice 45 is subjected to atmospheric pressure.

Figure 2:
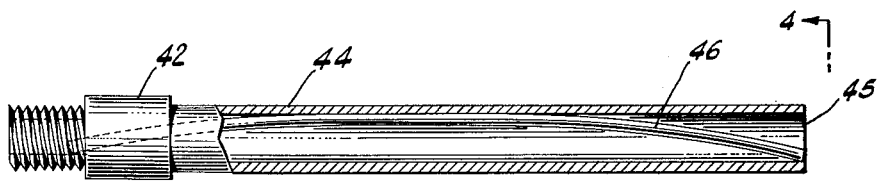
FIG. 2 is an enlarged view of the dispensing nozzle showing a rod restriction mounted within the nozzle.
Figure 4:
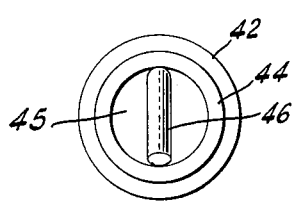
FIG. 4 is a magnified end view of FIG. 2 along line 4—4 showing the rod and nozzle.

Referring to FIG. 2, it has been found that a satisfactory dispensing nozzle 44 may be formed with an internally mounted rod restriction 46 having a diameter smaller than the internal diameter of the nozzle. The spacing between the rod 46 and the interior of the nozzle 44 provides a limited fluid passageway having the required given resistance to fluid flow. Rods of different diameters and cross-sectional configurations, such as the round rod shown in FIG. 4, may be utilized to vary the resistance of fluid flow as long as they are dimensionally compatible for insertion into the hollow of the nozzle and conducive to maintenance of the static fluid column as heretofore described. Mounting of the rod 46 can be achieved by imparting a slight camber to the rod so that it can be frictionally held within the hollow of the dispensing nozzle 44 as shown in FIG. 2. The orifice end of the rod is contained within the hollow of the nozzle adjacent orifice 45. The internal diameter of the dispensing nozzle 44 to be used with rod restriction 46 herein described may be of .025 inch and the replaceable rods may be dimensioned within a range of .015 to .018 inch in accordance with the rate of flow desired when the fluid column is moved by hydraulic pressure during dispensing.

Typical operation of the fluid dispenser occurs in the following manner. As the welding machine 48 operates through its functional cycle, the switching means 54 closes the circuit for electric timer 30. The timer then energizes and opens the solenoid valve 28 for a prescribed time period wherein a specified amount of pressurized fluid from reservoir 13 passes therethrough to force dispensing of fluid contained in the fluid column. The application of the pressurized fluid unbalances the static flow condition of the fluid column and pushes the fluid in the column toward the nozzle orifice whereat a predetermined amount of fluid is ejected onto the top welding electrode 50. The fluid thus dispensed flows down the top electrode to the welding area where it is completely vaporized by the welding heat to form the desired encompassing welding atmosphere.

Figure 3:
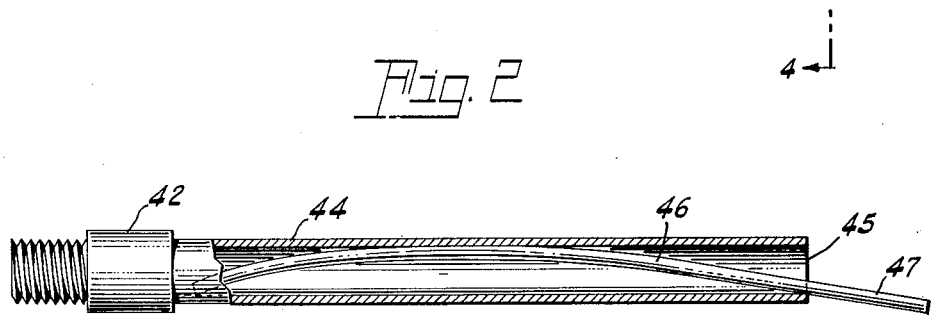
FIG. 3 illustrates an alternate embodiment wherein the rod is mounted within the nozzle and one end is extended therefrom as a stylus.

It has been found in some welding applications that the top welding electrode 50 becomes exceptionally hot by heat conduction from the weld. The close adjacency of the fluid loaded nozzle orifice 45 to hot electrode 50 tends to promote a gaseous cavitation immediately within the nozzle at the orifice. Such cavitation is an impediment to accurate fluid dispensing and creates an undesirable intermittency of fluid flow. In hot weld applications of this nature it has been found expedient to slightly reposition the dispensing nozzle 44 so that the orifice 45 thereof is removed from close adjacency with the top welding electrode 50. In this instance, the rod restriction 46, mounted within the hollow of the dispensing nozzle 44, may be lengthened to extend therefrom through the orifice 45 in a manner to provide an external tongue or fluid dispensing stylus 47, as shown in FIG. 3. This stylus 47 is positioned adjacent the top welding electrode 50, thereby providing means for transferring the flow of fluid ejected from the orifice 45 to the welding electrode 50. In this manner the fluid column is kept free of gaseous cavitation and the fluid can be properly and readily dispensed as needed.

The invention described herein provides controllable fluid dispensing and assures delivery of accurate quantities of fluid as may be repetitively desired at the weld area. In addition, there is provided a continuous cavitation-free supply of readily available fluid to the desired area where it is predeterminately dispensed without waste and without the production of an undesirable amount of noxious and combustible vapor.

While there has been shown and described what is at present considered the preferred embodiments of the invention, it will be obvious to those skilled in the art that various changes and modifications may be made therein without departing from the scope of the invention as defined by the appended claims.

What is claimed is:

1. A hydraulic pressure actuated device for controllably dispensing fluid comprising the combination of:
 a fluid supply source formed and positioned to provide a supply of fluid having pressure,
 valving means formed to reciprocate between an open and closed position and connected to said fluid supply source,
 a dispensing nozzle having an orifice and providing a limited fluid passageway of a substantially consistent dimension having a given longitudinal resistance to fluid flow,
 a tube interconnecting said valve means with said nozzle formed to provide a continuous fluid column from said valving means to said nozzle orifice, the resistance to fluid flow being sufficient to maintain the fluid column in said tube and nozzle when said valving means is closed and said orifice is at atmospheric pressure, and
 timing means and an externally controlled activating switch connected to said valving means to actuate opening thereof for a prescribed period of time for application of fluid from said fluid supply to said fluid column to overcome the resistance and eject a specified amount of fluid from said orifice, said switch being activated by means directly integrated with fluid dispensing requirements.

2. A hydraulic pressure actuated device for controllably dispensing fluid comprising the combination of:
   a fluid supply source formed and positioned to provide a supply of fluid under pressure,
   valving means formed to reciprocate between an open and closed position and connected to said fluid supply source,
   a hollow dispensing nozzle having an orifice with a given internal diameter,
   a rod having a diameter smaller than said internal diameter and having a camber formed to provide frictional mounting within said nozzle, the spacing between said rod and said nozzle providing a limited fluid passageway of a substantially consistent dimension having a given longitudinal resistance to fluid flow said rod extending at least to the orifice of said nozzle,
   a tube interconnecting said valving means with said nozzle formed to provide a continuous fluid column from said valving means to said nozzle orifice, the resistance to fluid flow being sufficient to maintain the fluid column in said tube and nozzle when said valving means is closed and said orifice is at atmospheric pressure, and
   timing means and an externally controlled activating switch connected to said valving means to actuate opening thereof for a prescribed period of time for application of fluid from said fluid supply to said fluid column to overcome the resistance and eject a specified amount of fluid from said orifice, said switch being activated by means directly integrated with fluid dispensing requirements.

3. A hydraulic pressure actuated device for controllably dispensing fluid comprising the combination of:
   a fluid supply source formed and positioned to provide a supply of fluid under pressure,
   valving means formed to reciprocate between an open and closed position and connected to said fluid supply source,
   a hollow dispensing nozzle having an orifice with a given internal diameter,
   a rod having a diameter smaller than said internal diameter and having a camber formed to provide frictional mounting within said nozzle and extending therefrom to provide a fluid dispensing stylus, the spacing between said rod and said nozzle providing a limited fluid passageway having a given resistance to fluid flow,
   a tube interconnecting said valving means with said nozzle formed to provide a continuous fluid column from said valving means to said nozzle orifice, the resistance to fluid flow being sufficient to maintain the fluid column in said tube and nozzle when said valving means is closed and said orifice is at atmospheric pressure, and
   timing means connected to said valving means to actuate opening thereof for a prescribed period of time for application of fluid from said fluid supply to said fluid column to overcome the resistance and eject a specified amount of fluid from said orifice along said dispensing stylus.

4. A hydraulic pressure actuated device for controllably dispensing a volatile fluid to provide a reducing atmosphere for the welding area of a welding mechanism comprising the combination of:
   a fluid containing reservoir mounted for height adjustment to provide a gravity-fed variable pressure fluid source,
   a solenoid valve mounted on the level below said reservoir and connected therewith for fluid conduction,
   a hollow dispensing nozzle having an orifice with a given internal diameter mounted on said welding mechanism to provide for the delivery of said fluid to said welding area,
   a rod having a diameter smaller than said internal diameter and having a camber formed to provide frictional mounting within said nozzle and extending therefrom to provide a fluid dispensing stylus, the spacing between said rod and said nozzle providing a limited fluid passageway having a given resistance to fluid flow,
   a tube interconnecting said solenoid valve with said nozzle formed to provide a continuous fluid column from said solenoid valve to said nozzle orifice, the resistance to fluid flow being sufficient to maintain the fluid column in said tube and nozzle when said solenoid valve is closed and said orifice is at atmospheric pressure, and
   an electrically operated variable timer connected to said welding mechanism and said solenoid valve to actuate opening thereof for a prescribed period of time for application of fluid from said reservoir to said fluid column to overcome the resistance and eject a specified amount of fluid from said orifice along said dispensing stylus.

5. In combination a welder and a hydraulic pressure actuated device for controllably dispensing a volatile fluid to provide a reducing atmosphere for the welding area comprising:
   a fluid supply source formed and positioned to provide a supply of fluid under pressure,
   a solenoid valve connected to said fluid supply source to provide controllable fluid delivery therefrom,
   a hollow dispensing nozzle having an orifice with a given internal diameter mounted on said welder to provide for the delivery of said fluid to said welding area,
   a tube interconnecting said solenoid valve with said nozzle formed to provide a continuous fluid column from said solenoid valve to said nozzle orifice, the resistance to fluid flow being sufficient to maintain the fluid column in said tube and nozzle when said solenoid valve is closed and said orifice is at atmospheric pressure,
   a welder having a fixed electrode and a movable electrode and fluid dispensing switching means formed to be actuated as said movable electrode approaches said fixed electrode in welding relationship, and
   an electrically operated variable timer connected to said welder switching means and said solenoid valve to actuate opening thereof for a prescribed period of time for application of fluid from said reservoir to said fluid column to overcome the resistance and eject a specified amount of fluid from said nozzle orifice onto said movable electrode during prewelding movement thereof.

References Cited by the Examiner

UNITED STATES PATENTS

| | | | |
|---|---|---|---|
| 1,657,196 | 1/28 | Brinton | 184—45 |
| 2,254,833 | 9/41 | Ashkenaz. | |
| 2,409,469 | 10/46 | Bravo | 222—422 |
| 2,605,937 | 8/52 | Bradley | 222—547 X |
| 2,682,984 | 7/54 | Melikian | 222—70 X |
| 2,723,331 | 11/55 | Tyrner | 113—133 |
| 2,726,620 | 12/55 | Meissner | 113—133 |
| 2,957,440 | 10/60 | Schaefer | 113—95 X |

FOREIGN PATENTS

| | | |
|---|---|---|
| 1,057,314 | 3/54 | France. |
| 53,814 | 10/90 | Germany. |

LOUIS J. DEMBO, *Primary Examiner.*